(12) United States Patent
Hansen et al.

(10) Patent No.: US 7,882,960 B2
(45) Date of Patent: Feb. 8, 2011

(54) APPARATUS FOR THE SEPARATION OF DRY MATTER FROM A FLUID

(75) Inventors: Preben B. Hansen, Gentofte (DK); Peter Stubbe, Birkerod (DK); Hanne Birch, Gentofte (DK); Kirsten G. Sorensen, Birkerod (DK)

(73) Assignee: Danmarks Tekniske Universitet (DK)

( * ) Notice: Subject to any disclaimer, the term of this patent is extended or adjusted under 35 U.S.C. 154(b) by 342 days.

(21) Appl. No.: 11/571,357

(22) PCT Filed: Jul. 1, 2005

(86) PCT No.: PCT/DK2005/000452

§ 371 (c)(1), (2), (4) Date: Mar. 28, 2007

(87) PCT Pub. No.: WO2006/002638

PCT Pub. Date: Jan. 12, 2006

(65) Prior Publication Data

US 2008/0035560 A1 Feb. 14, 2008

(30) Foreign Application Priority Data

Jul. 1, 2004 (DK) .............................. 2004 01043

(51) Int. Cl.
*B01D 33/04* (2006.01)
*B01D 33/46* (2006.01)
*B01D 33/64* (2006.01)
*B01D 29/92* (2006.01)

(52) U.S. Cl. .............. 210/386; 210/391; 210/396; 210/398; 210/400; 210/401

(58) Field of Classification Search ................ None
See application file for complete search history.

(56) References Cited

U.S. PATENT DOCUMENTS

| 2,734,377 | A | * | 2/1956 | Traver ................. 73/61.71 |
| 3,453,951 | A | | 7/1969 | Malarkey, Jr. |
| 7,651,619 | B2 | * | 1/2010 | Hansen et al. ........... 210/695 |
| 2008/0035560 | A1 | * | 2/2008 | Hansen et al. ........... 210/524 |

FOREIGN PATENT DOCUMENTS

| DE | 1924471 | 11/1970 |
| JP | 56073514 | 6/1981 |
| JP | 58159820 | 9/1983 |
| WO | WO 03/055570 | 7/2003 |
| WO | WO 2006002638 A1 * | 1/2006 |

\* cited by examiner

*Primary Examiner*—Robert James Popovics
(74) *Attorney, Agent, or Firm*—Gifford, Krass, Sprinkle, Anderson & Citkowski, P.C.

(57) ABSTRACT

The invention relates to an apparatus for continuous separation of dry matter from a fluid, comprising an enclosed environment capable of being under vacuum or under positive pressure, in which enclosed environment a number of rollers (1, 3, 4, 4', 6, 6', 20, 21, 22, 23) form a chamber which is divided into two or more compartments (12, 13, 24, 27, 25, 26) by filtration means (7, 8, 16, 29, 36, 37, 38, 40), wherein one or more filtrated chambers (9, 10) are placed on the pure side of the filter means. In order to allow for cleaning and/or maintenance of the filtrate chambers, additional filtrate chambers are provided, which are separated from the first filtrate chambers by a wall. One of the filtrate chambers at any time is placed under the filter, while the other filtrate chambers are situated outside the enclosure for maintenance/cleaning.

10 Claims, 11 Drawing Sheets

APPARATUS FOR THE SEPARATION OF DRY MATTER FROM A FLUID

THE PRIOR ART

Figure 1:
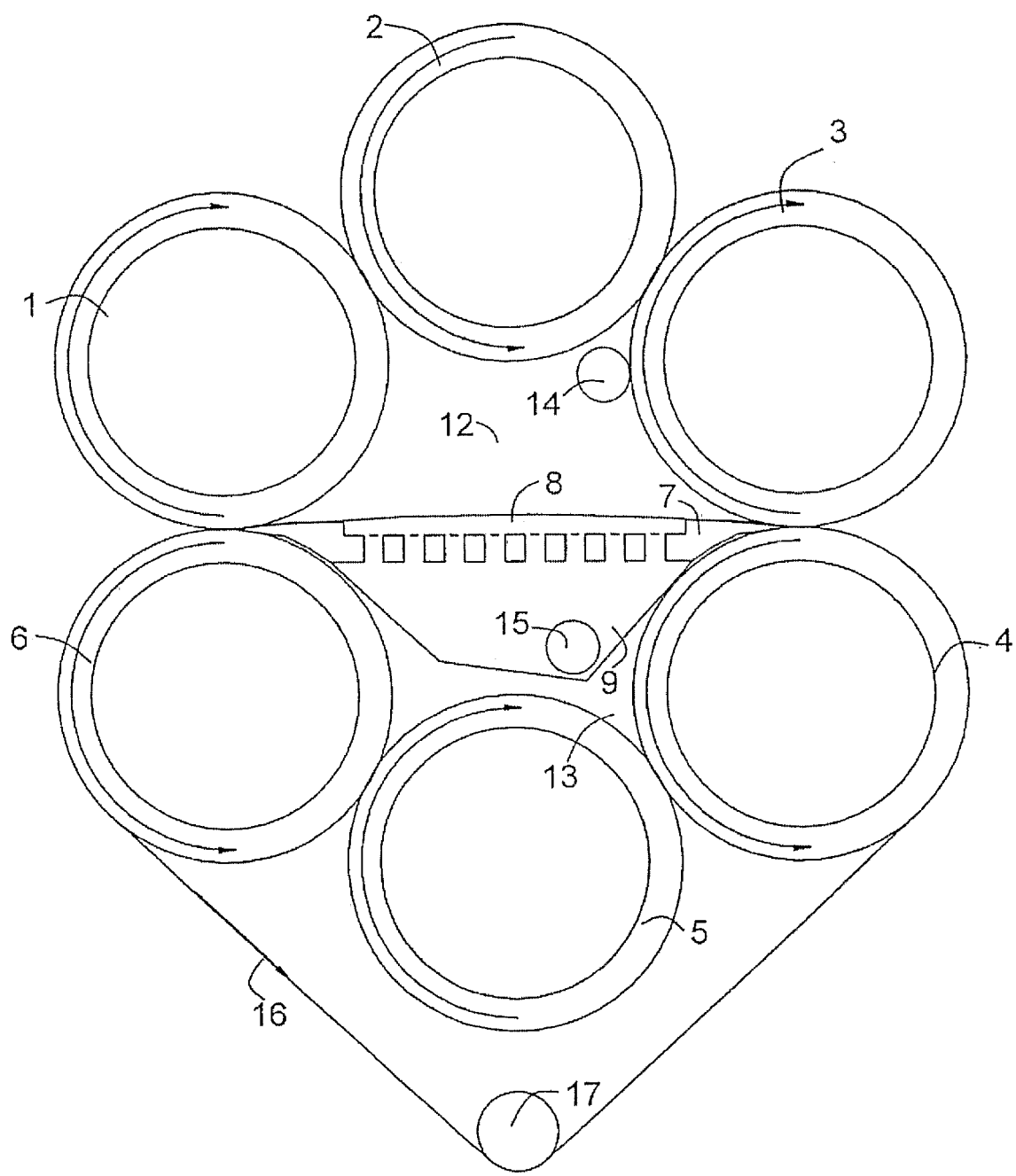

The invention relates to an apparatus for continuous separation of dry matter from a fluid, comprising an enclosed separation environment capable of being under vacuum or under POSITIVE pressure, IN WHICH enclosed environment a number of rollers form a chamber which is divided into two or more compartments by filtration means.

Separation may generally have more purposes. One purpose could be separation by a kind of filtration, isolating solids from fluids e.g. by an air filter, purifying air or a gas. Another purpose could be filtration of solid particles from a gas or an air stream for the purpose of gathering the particles for some kind of use, or a combination of both. In other words, some times it is desirable to obtain purified solids, some times it is desirable to obtain purified fluids (i.e. liquids or gases), depending on what end product is wanted, and some times it is desirable to obtain and use the separated solids as well as the purified fluid.

In this context, fluid is to be understood as a liquid, a gas or a mixture of both.

WO 03/055570 A1 discloses a filtration method and an apparatus by means of a system of rollers. The rollers form a chamber which is divided into two compartments by means of a filter capable of continuous removal of dry matter from a liquid having a high dry matter content, thereby providing a method and an apparatus capable of reducing the loss of a liquid from the suspension and, at the same time, obtaining an increased filtration capacity.

THE OBJECT OF THE INVENTION

The object of the present invention is to ensure that the purified matter still remains purified, at the same time taking into consideration that it is very important to establish or keep a clean filter area to ensure an effective and adequate continuous separation process, and this is achieved according to the invention by an apparatus, wherein each filtrate chamber is configured to be extended by more filtrate chambers which are separated from the filtrate chamber by one or more walls, wherein one of the filtrate chambers at any time is placed under the filter as a collecting part, while the filtrate chambers are situated outside the enclosure.

This ensures that only the purified fluid gets to a filtrate chamber, from where the purified fluid can be extracted or transported to a new clean environment. This provides the possibility of pressing the separated dry matter, also called the filter cake, in a continuous flow, depending on the rotational speed of the rollers.

The object of the measures according to the claims will be described in connection with the exemplary embodiments.

THE DRAWING

Figure 2:
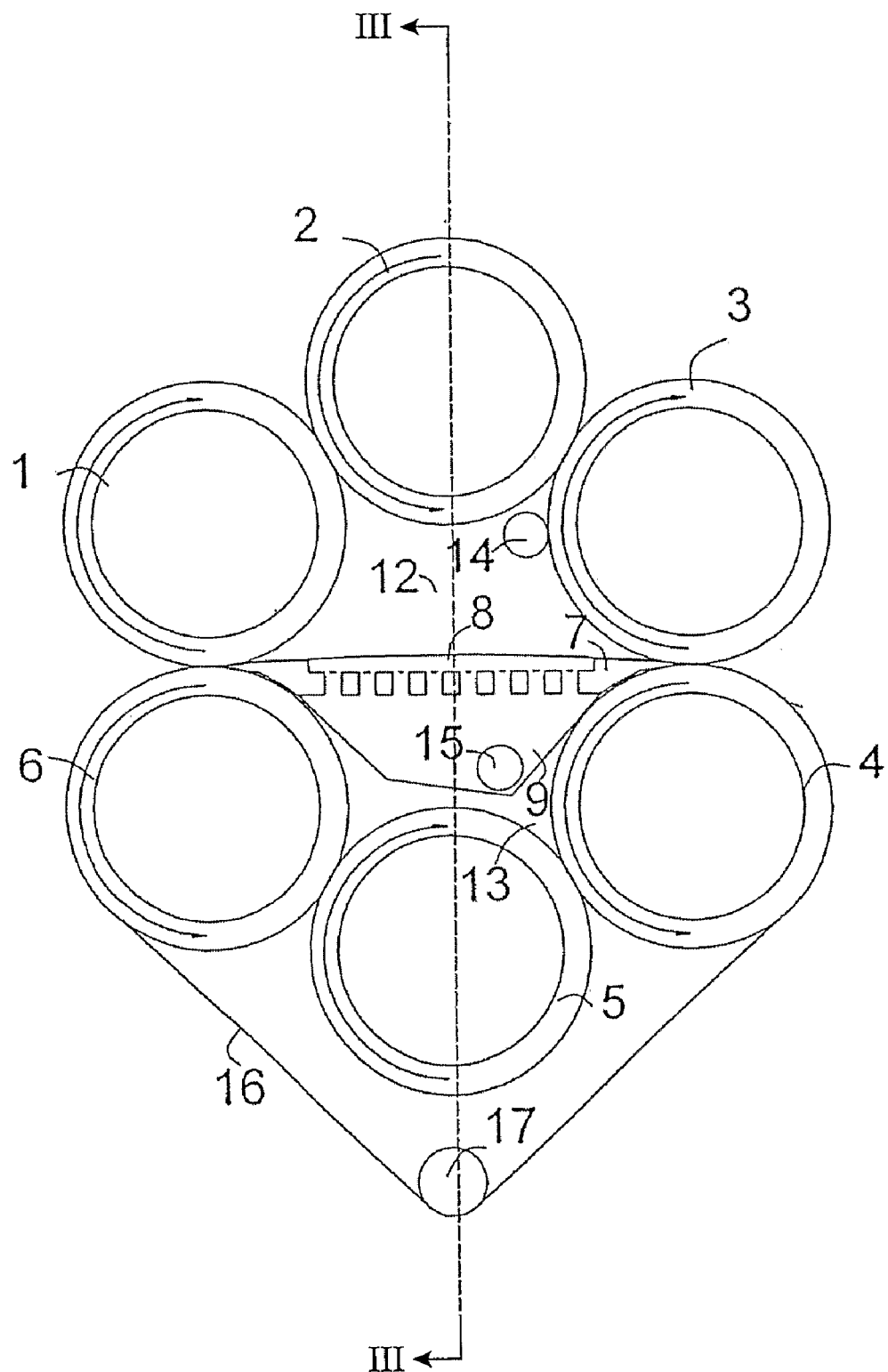
Figure 3:
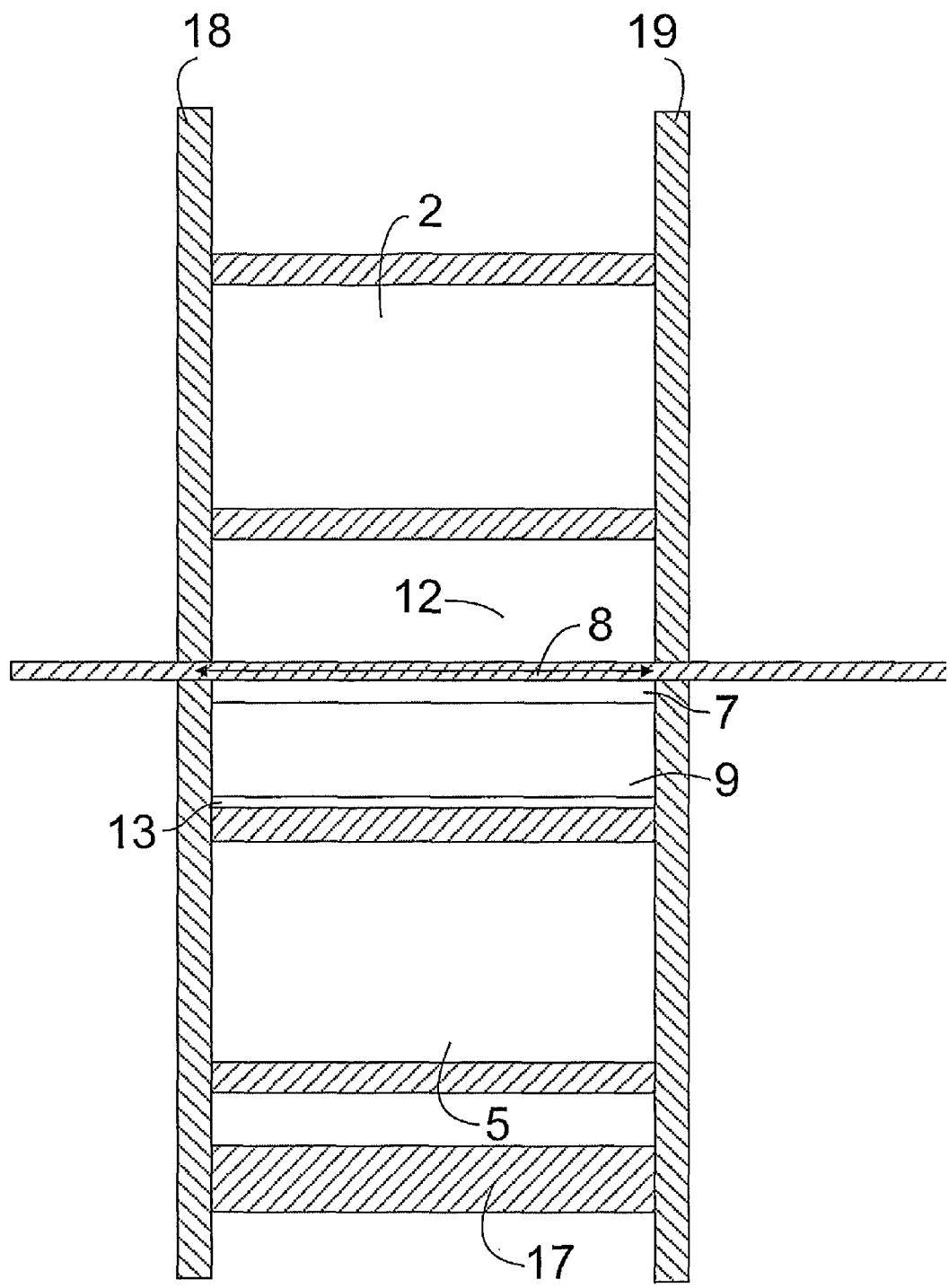
Figure 4:
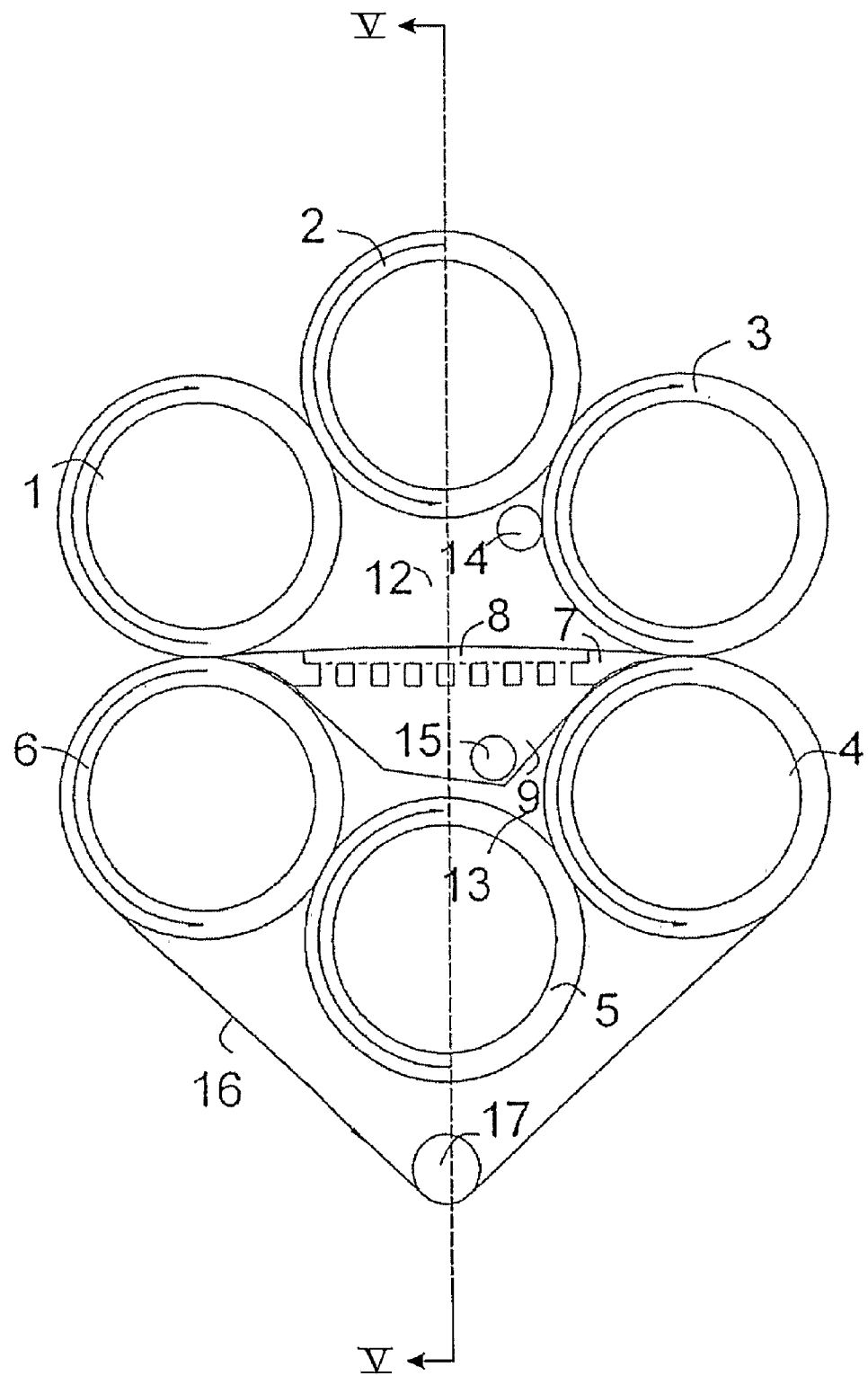
Figure 5:
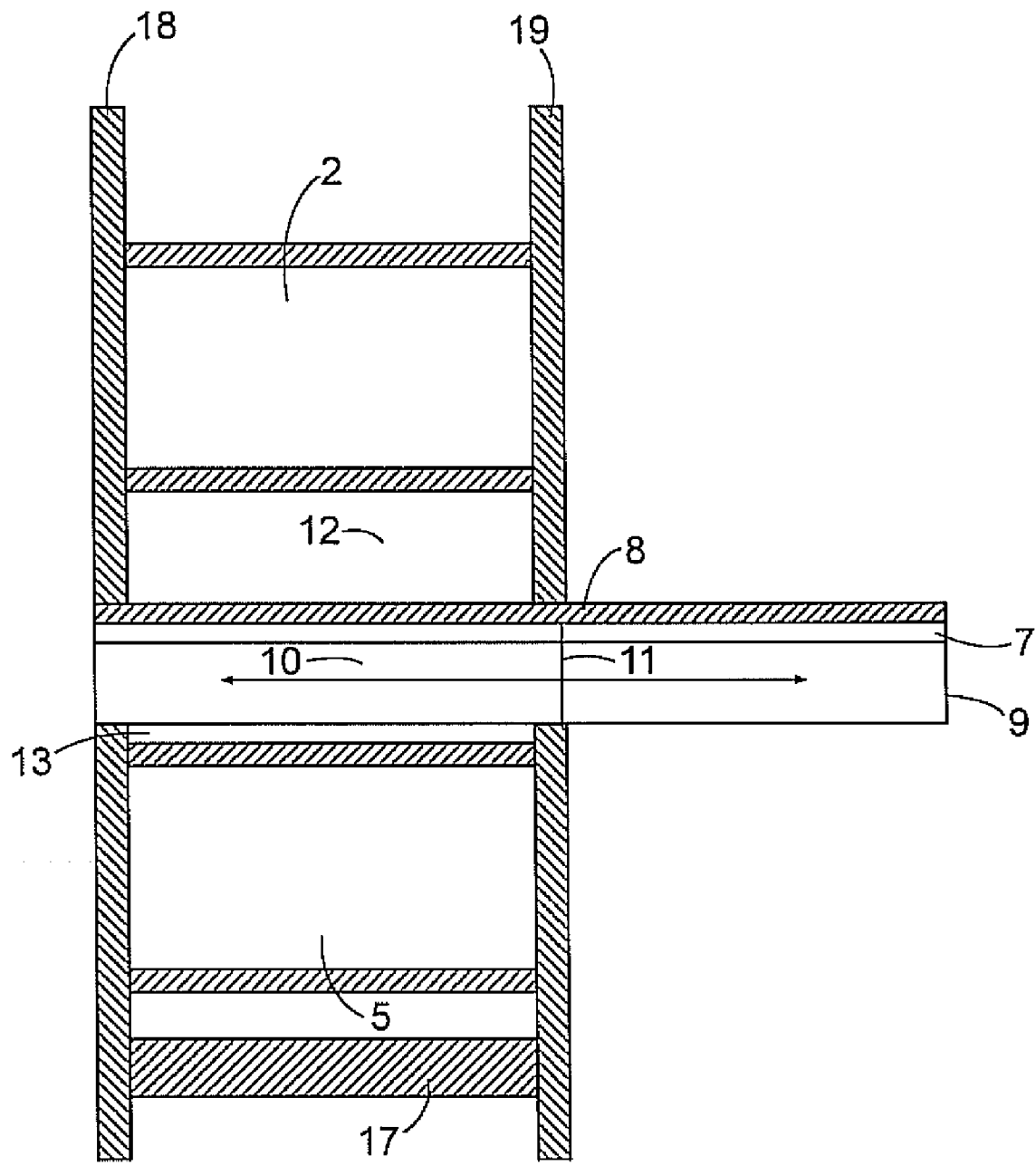
Figure 6:
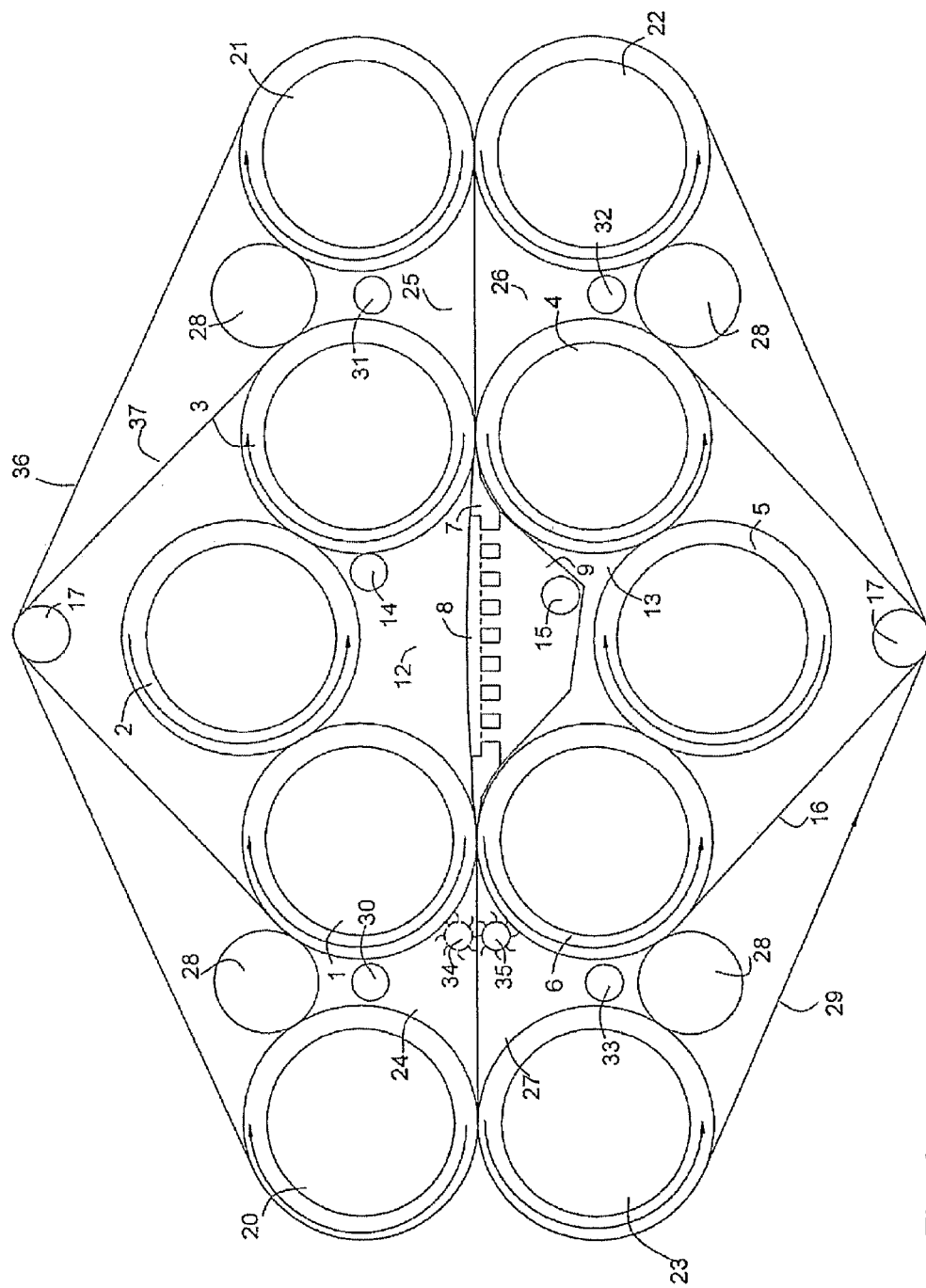
Figure 7:
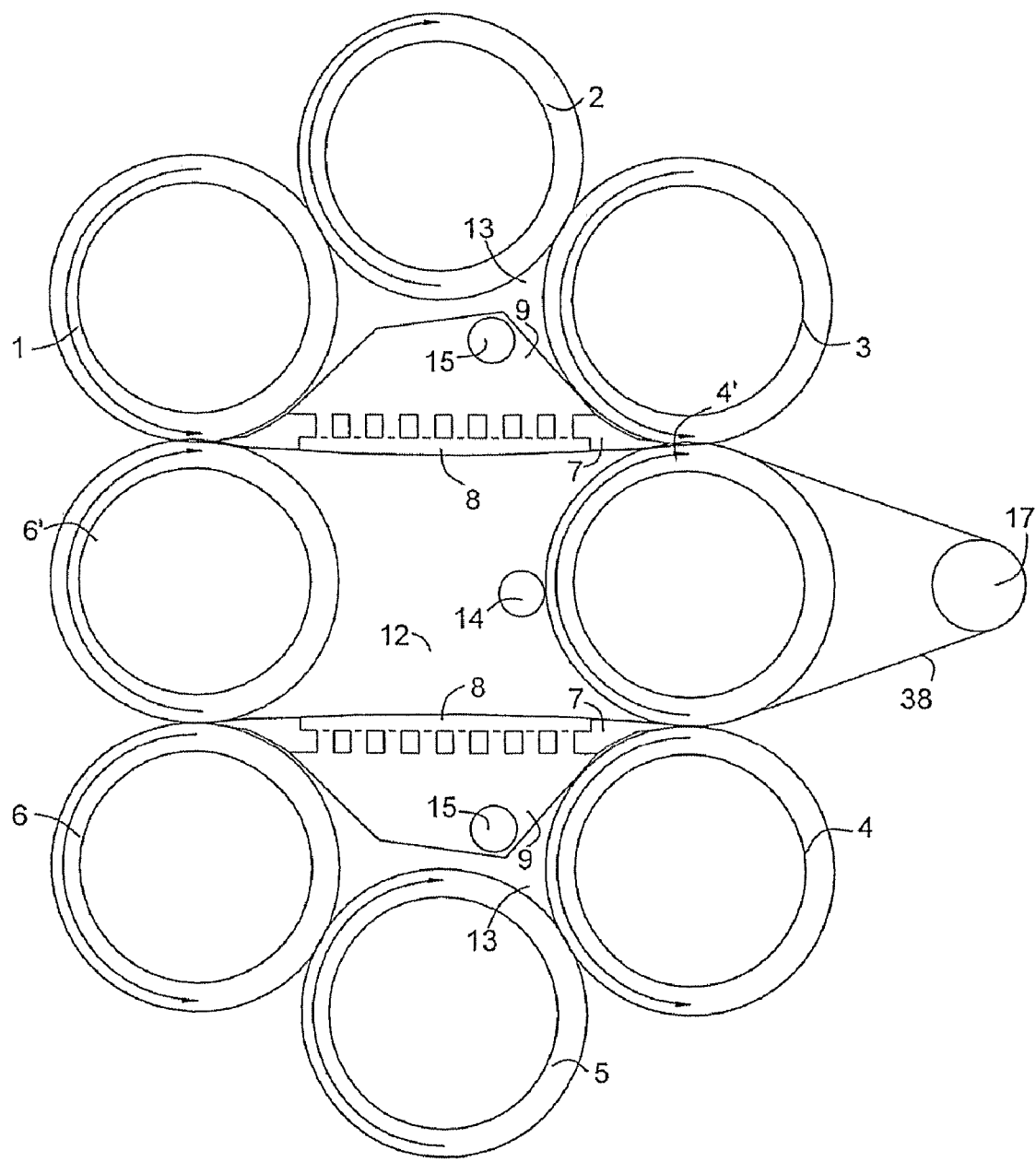
Figure 8:
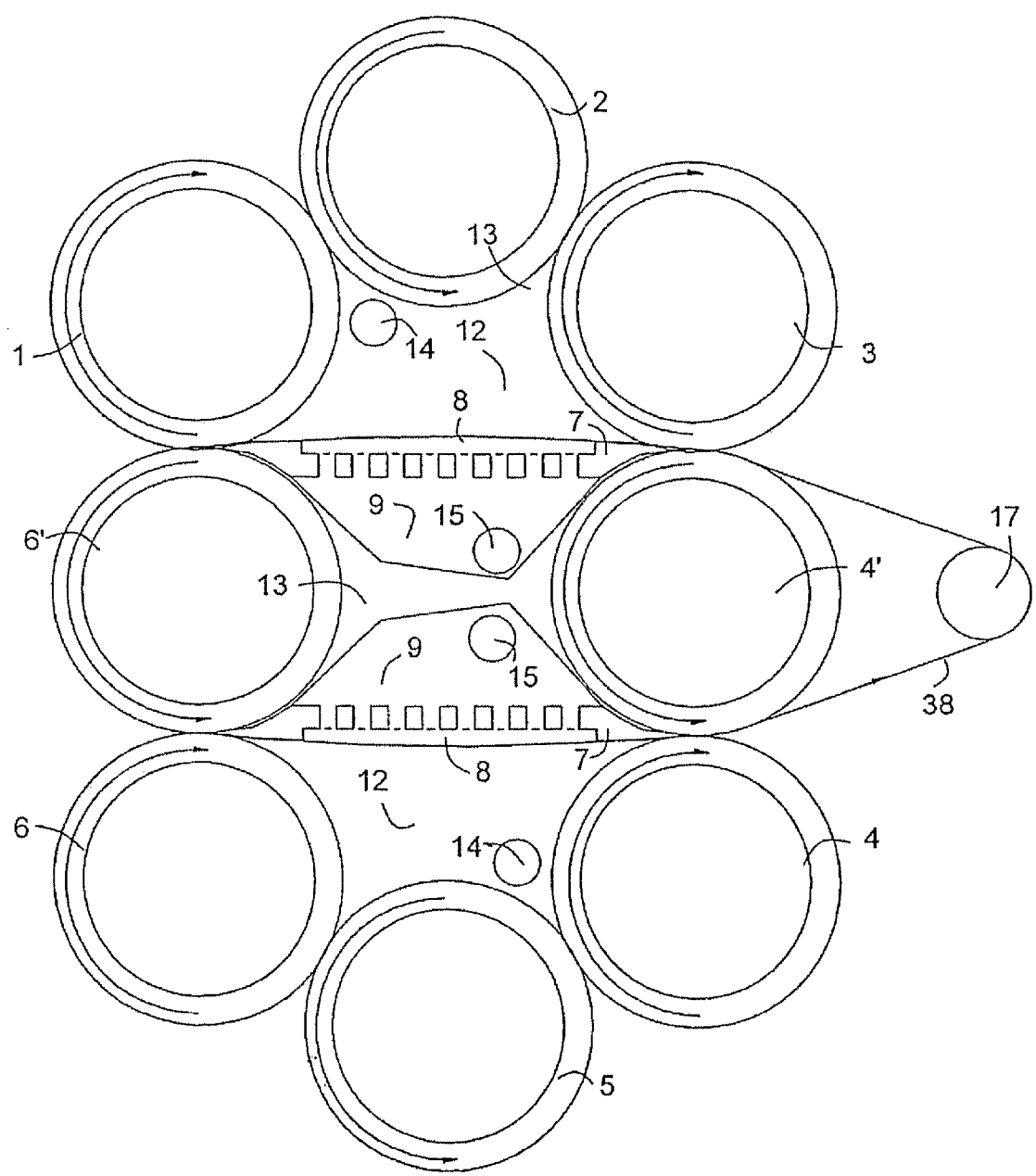
Figure 9:
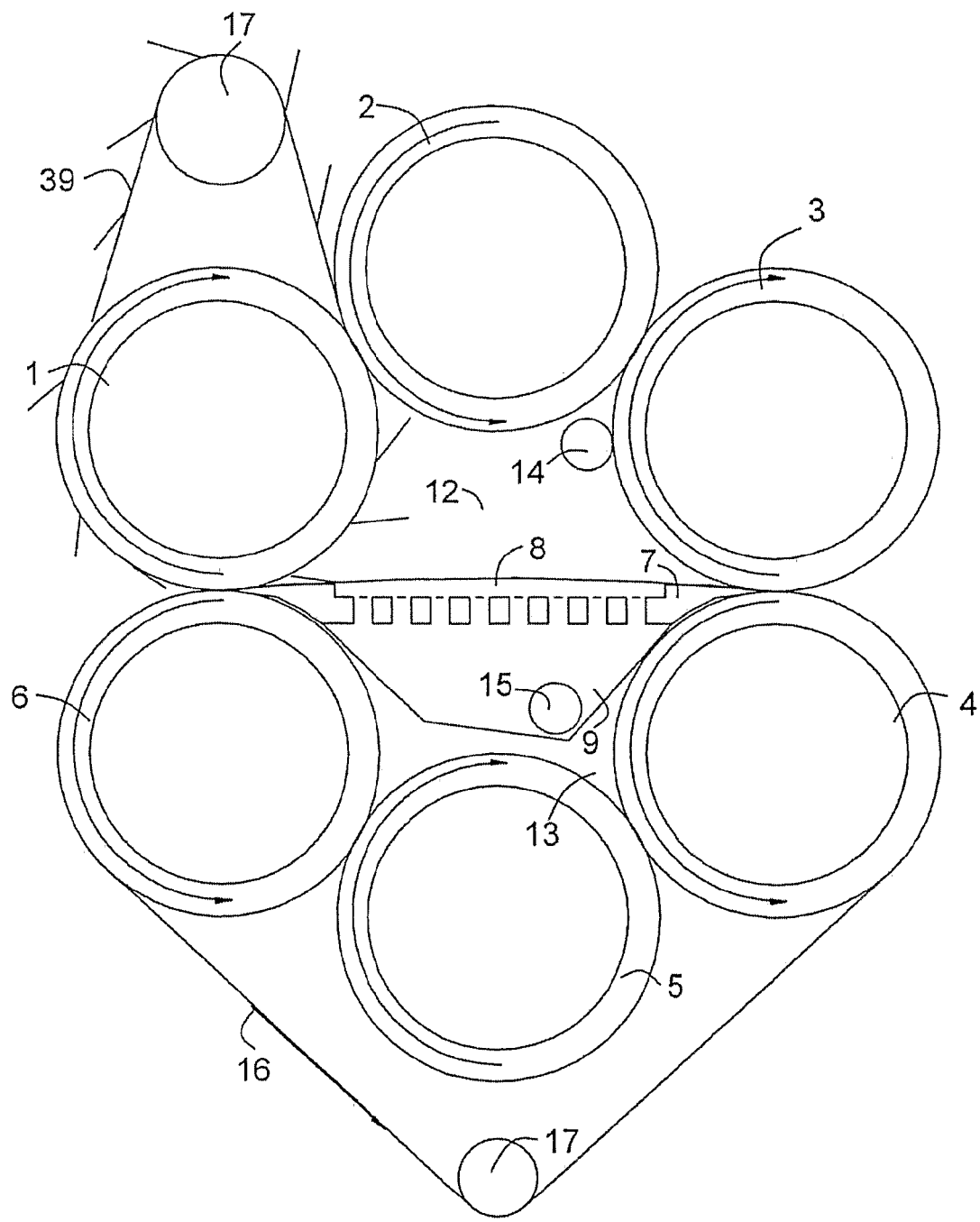
Figure 10:
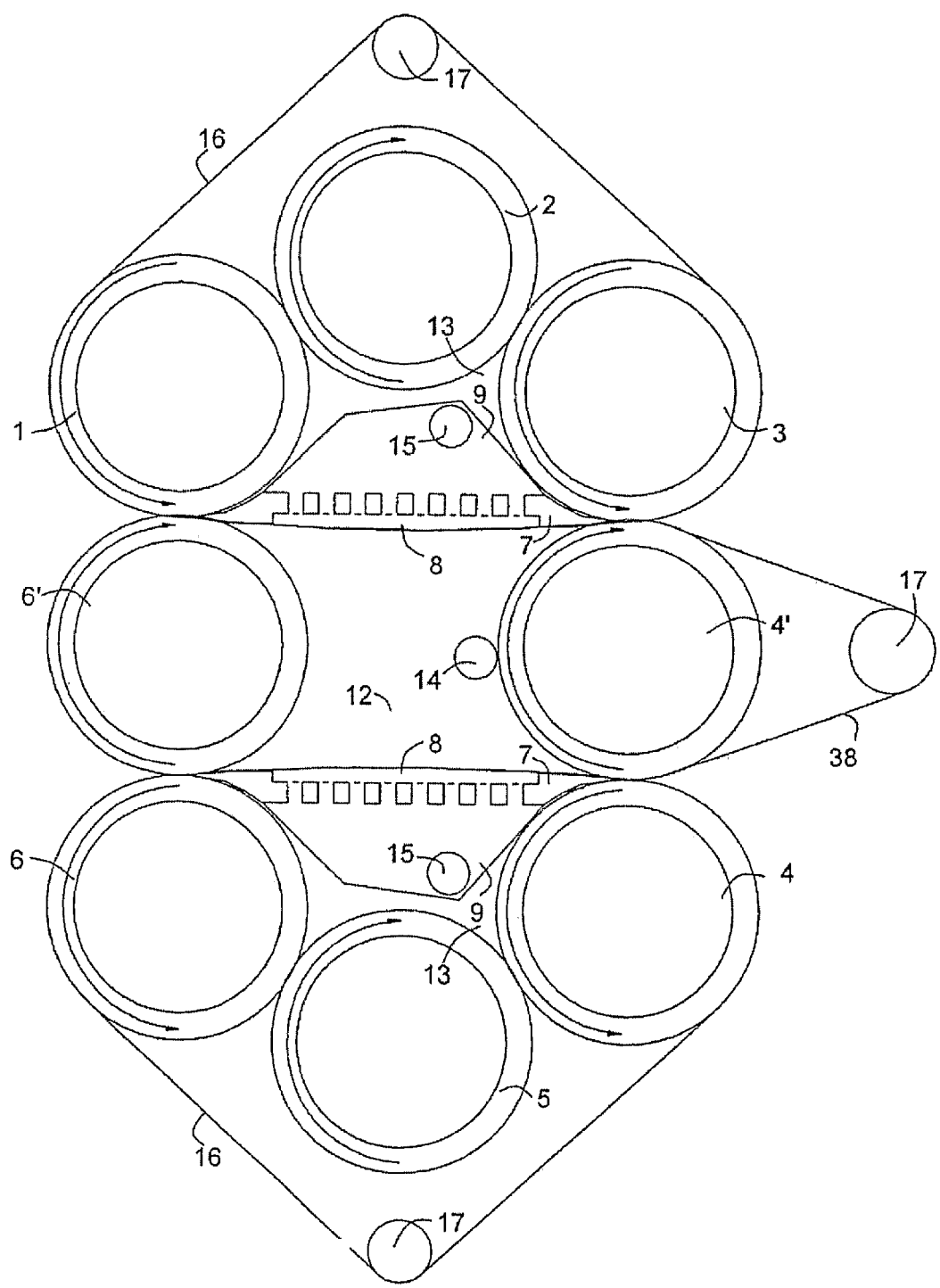
Figure 11:
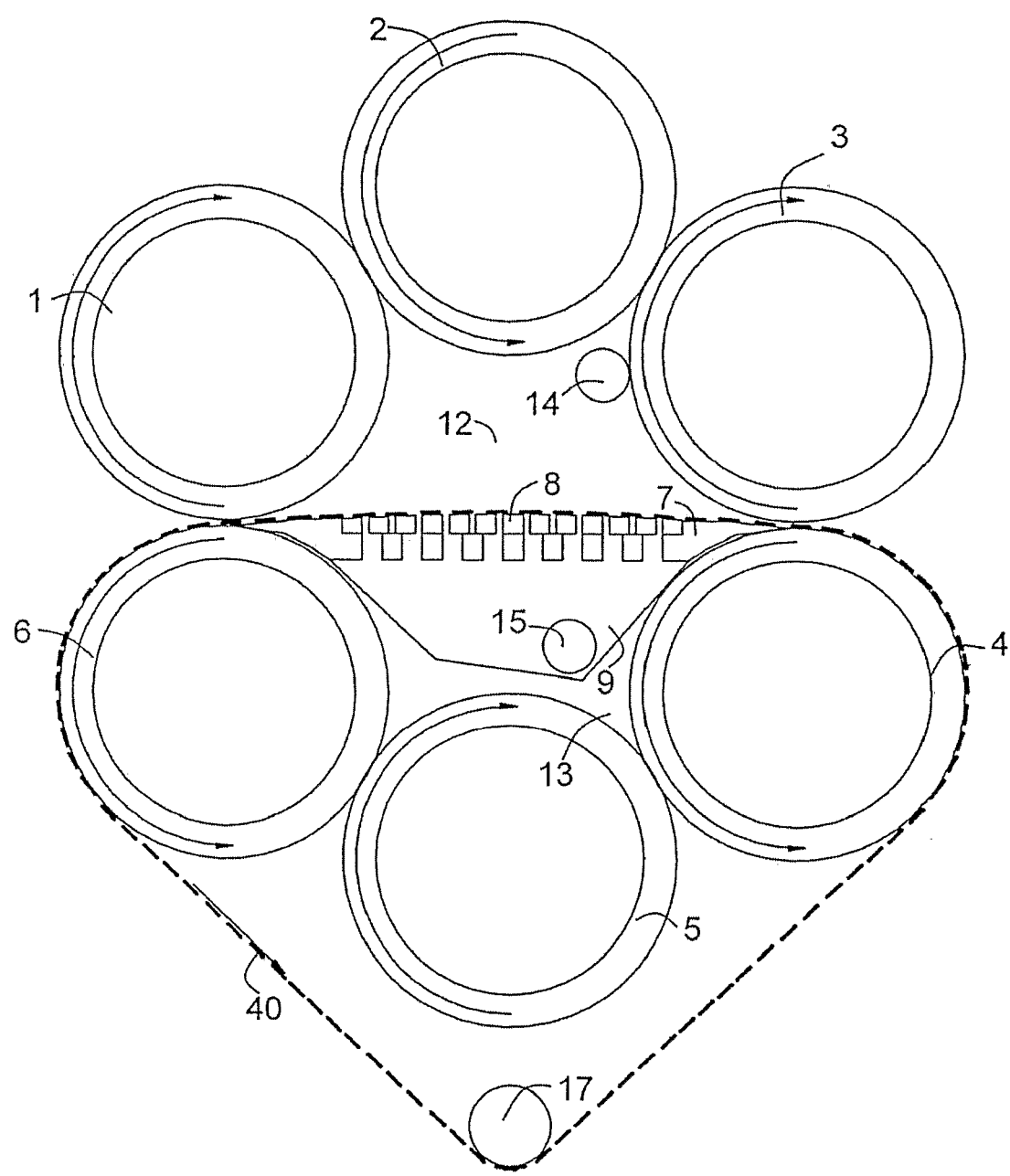

The invention will now be explained in more detail with reference to the drawing, in which FIG. 1 shows a filtration apparatus where rollers form a closed filtration environment which is divided by a filter into a feed chamber where the feed is introduced through an inlet, and a separate filtrate chamber where the filtrate is removed through an outlet, FIG. 2 shows the apparatus, FIG. 3 shows a cross-section along the line III-III of the system shown in FIG. 1, FIG. 4 shows the apparatus where a support plate, a final guarding filter and the filtrate chamber extend beyond the width of the machine, FIG. 5 shows a cross-section along the line V-V of the system shown in FIG. 4, FIG. 6 shows an apparatus as described in FIG. 1 extended with chambers enclosed by rollers, in which chambers filter cake is removed by brushing or scraping means, or where cleaning or disinfecting means can act, FIG. 7 shows another embodiment of the apparatus shown in FIG. 1 using two filtrate chambers in order to utilize a larger part of the length of the filter, FIG. 8 shows a further embodiment of the apparatus shown in FIG. 7, with the filtrate chamber placed in the centre of the apparatus, FIG. 9 shows an embodiment similar to the system shown in FIG. 1, but equipped with a helping band with flaps to help a roller collecting and enclosing a filter cake, FIG. 10 shows an embodiment similar to the apparatus shown in FIG. 7, extended with extra filters, and FIG. 11 shows an embodiment of the apparatus as shown in FIG. 1 with a coarser filter.

DESCRIPTION OF THE EXEMPLARY EMBODIMENTS

In the following, preferred embodiments will be described with reference to the drawing.

In order to obtain a method for continuous separation of dry matter from a fluid for the purpose of using the dry matter, the fluid or both for further use, the fluid is led to an enclosed separation environment comprising at least two compartments 12, 13. These compartments 12, 13 are divided by at least one filtration means 16, 38 for continuous separation, and at least the one filter 16, 38 passes through at least one set of rollers 1, 6, 3, 4, the rollers 1, 6, 3, 4 forming part of the enclosure.

In order to ensure that the filtrated matter remains clean or purified, one or more chambers 9 are provided within the enclosed separation environment 12, 13, said chambers 9, which are placed on the pure side of a filter 7, 8, 16, 38, 40, being configured to receive a purified substance of the suspension.

A first embodiment of the apparatus, FIG. 1, has a filtration machine where rollers 1, 2, 3, 4, 5, 6 form a closed filtration environment. The filtration environment is divided by a filter 16 formed as an endless belt which is tightened by a roller 17. In the filtration area, a perforated plate 7 supports the filter 16. The filtration area is divided into a feed chamber 12 where the feed is introduced through an inlet 14, and a filtrate chamber 9 where the filtrate is removed through an outlet 15. The filtrate chamber 9 is formed by an enclosure mounted at the bottom of the support plate 7. An area 13 forms an outer part of the filtrate chamber 9, where leaked matter around the edges of the support plate 7 or unfiltrated matter from diminutive leaks between the rollers can be collected. The area 13 has no direct contact to the inner part of the filtrate chamber 9, and thereby it is ensured that the filtrate remains clean or purified. A final guarding filter 8 can be inserted into the support plate 7 to ensure an absolute filtration level.

FIGS. 2 and 3 show the system and a cross-section along the line III-III of the system described above. Two end plates 18 and 19 close the system at the ends of the rollers 1, 2, 3, 4, 5, 6 and 17. If the final guarding filter 8 is fouled, it can be displaced through the side of the system to be replaced by a clean filter. The part outside the machine can be cleaned, while the part inside the machine is filtrating.

FIGS. 4 and 5 show the system and a cross-section along the line V-V of the system described with reference to FIGS. 1 and 2 in an embodiment, where the support plate 7 and the final guarding filter 8 are at least twice as wide as the machine, and the filtrate chamber 9 is extended by another filtrate chamber 10 which is separated from the filtrate chamber 9 by a wall 11. At any given time, only one chamber 9, 10 is placed in the machine under the filter 16, while the other chamber 9, 10 is outside the machine for cleaning and/or maintenance. If necessary, more chambers divided by walls could be arranged side by side in line.

In another embodiment, a system described as the system in FIG. 1 is shown in FIG. 6 and extended with chambers 24, 27 enclosed by rollers 20, 23, 28. In these chambers filter cake (not shown) is removed by brushes or scrapers 34, 35. The filter cake can be swept away by air flow or flushed by water through in- and outlets 30, 33. A chamber 25, 26 for cleaning or disinfection is enclosed by rollers 21, 22, 28, where a cleaning or disinfection agent can be circulated through in- and outlets 31, 32. Besides the original filter 16, the system can be fitted with filters 29, 36, 37 placed on top of each other in order to facilitate the removal of the filter cake when the filters are detached, or in order to obtain a depth filter, which is a surface filter for retaining material at the surface of the filter, leading to a dense layer which restricts the flow towards the filter. A depth filter has a more open structure than a surface filter and allows the retained material to enter the structure of the filter where the material is trapped. This leads to a more open filter cake with a less severe impact on the flow through the filter. However, the filter cake can be more difficult to remove from a depth filter than from the original filter.

In a further embodiment of the system shown in FIG. 6, the inlet opening 31 is used as a feeding means for the supply of the filtrating matter to be filtrated into the chamber 25, from where the filtration matter is transported between two or more filter layers 36, 37 and pressed by the rollers 3, 4, 1, 6, thereby forming the enclosure 12, 13. The layers of filters hold and convey the filtration matter on its way through the separation environment.

When the filtration matter has been pressed and separated, it is possible to flush the filtration matter, although said filtration matter is positioned and retained between the filters 36, 37. This flushing takes place preferably through the inlet 14 in the feed chamber 12 and out through the outlet 15. This process could be performed as a repetitive process.

The process could also be performed through the lower part of the system using the outlet 32 as an inlet and the filters 16, 29 as retaining filters. Further, the process may be performed as a combination of both of the above-mentioned systems.

When the retaining filters 16, 29, 36, 37 have separated after having passed the rollers 1, 6, brushes or scrapers 34, 35 remove the filter cakes.

The process could optionally proceed in more following steps thereby repeating the flushing after pressing.

The flushing can be performed with agents with different characteristics, possibly obtained by addition of additives.

A modified embodiment of the original system shown in FIG. 1 is shown in FIG. 7 and comprises two filtrate chambers 9. In order to utilize a larger part of the length of the filter 7, 38, the filter 7, 38 traverses the filtration area twice, thereby doubling the filtrating length without increasing the length of the filter.

In FIG. 8, a further embodiment based on the same concept shows a system as shown in FIG. 7, except for the filtrate chamber 9 which is placed in the centre of the machine, and except for the feed chambers 12, which feed chambers 12 are placed above and below the filtrate chamber 9. Thereby the filter cake produced from the filter in the upper chamber can be removed from the filter above the top of the roller 6 before reentering the lower feed chamber.

It is hereby understood that more filtrate chambers could be arranged along the movable filter 38.

An embodiment similar to the system shown in FIG. 1 is shown in FIG. 9, where one of the rollers 1, 6, placed where the filter 16 leaves the enclosure 12, 13, is equipped with a helping band 39 with flaps to help roller 1, 6 to collect and to enclose the filter cake.

An embodiment similar to the system shown in FIG. 7 is shown in FIG. 10, here provided with extra filters 16 to support filter 38 or to give a depth filter effect, or to facilitate the removal of the filter cake.

An embodiment of a system as shown in FIG. 1 is shown in FIG. 11 where a filter 40 is coarser than the filter 8. Therefore, the filter cake accumulates on top of filter 8, but will be scraped off and transported away by the movable filter 40.

The rollers 1, 2, 3, 4, 4', 5, 6, 6', and 17 can be arranged for floating in their longitudinal direction. The floating feature is obtainable in a preferred embodiment by the way the ends of the rollers 1, 2, 3, 4, 4', 5, 6, 6', and 17 are fixed by seals (not shown), whereby the compression of the rubber in the rollers 1, 2, 3, 4, 4', 5, 6, 6', and 17, the compression of the seals or a combination thereof give the flexibility.

This results in a flexible suspension of the rollers 1, 2, 3, 4, 4', 5, 6, 6', and 17 as well as an adequate sealing between the rollers 1, 2, 3, 4, 4', 5, 6, 6', and 17 and the end plates 18, 19 of the system.

It will be appreciated that the apparatus could be configured with several adjacent individually separated enclosures. These enclosures can be arranged as long rollers being divided by a number of plates (N) together forming a number of enclosures (N−1).

As to the apparatus in general, it is possible to ensure a correct tensioning of the moving filter by having separate rotational speed and thereby different tractive effort applied to each of the separate rollers in the moving direction of the filter.

Further, in order to ensure an effective cleaning of the system and the filter or at least a part of the filter, cleaning means are provided. It is possible to clean the filter, for instance by using pyrolysis or by performing a backwash with the clean separated matter. In order to prevent formation of germ, the support filter and/or all the filters could be treated with a disinfecting agent, for instance Hydrogen Peroxide.

The invention claimed is:

1. An apparatus for the separation of a suspension of dry matter from a fluid, said apparatus comprising an enclosed separation environment capable of sustaining a pressure above or below ambient, wherein a plurality of rollers define said separation environment which is divided into at least two chambers by a filter, one of said chambers being a filtrate chamber configured to receive a purified component of said suspension, wherein the filtrate chamber is further configured so as to include a wall which divides the filtrate chamber into two portions, and one of said portions is disposed in the separation environment, under the filter, so as to collect said filtrate, while the other portion is disposed outside of said separation environment.

2. The apparatus as in claim 1, wherein said apparatus includes further chambers wherein one or more of the following operations take place: cleaning and/or disinfecting of the filter, and removal of filter cake by brushing and/or scraping.

3. The apparatus of claim 1, wherein said filter comprises a movable belt.

4. The apparatus of claim 3, wherein said belt is an endless belt filter which in the use of the apparatus is moved therethrough.

5. The apparatus of claim 4, further including a helping band which includes at least one flap, said helping band being disposed and operable so as to contact said endless belt filter with said flap as said belt filter is moved through said apparatus.

6. The apparatus of claim 4, including a movable support filter disposed so as to engage said endless belt filter as it moves through said apparatus.

7. The apparatus of claim 6, wherein the porosity of said support filter is greater than the porosity of said belt filter.

8. The apparatus of claim 1, including at least six rollers, wherein said filter comprises an endless belt filter which passes around at least two of said rollers, said rollers and belt being disposed so as to define an interior chamber on the inside of said belt and two exterior chambers on the outside of said belt.

9. The apparatus of claim 8, wherein said interior chamber is a filtrate chamber.

10. The apparatus of claim 8, wherein said exterior chambers are filtrate chambers.

* * * * *